United States Patent
Miyazaki

(10) Patent No.: US 8,944,638 B2
(45) Date of Patent: Feb. 3, 2015

(54) LIGHT SOURCE DEVICE AND PROJECTION TYPE DISPLAY DEVICE INCLUDING THE SAME

(75) Inventor: Kenji Miyazaki, Tokyo (JP)

(73) Assignee: NEC Display Solutions, Ltd., Tokyo (JP)

( * ) Notice: Subject to any disclaimer, the term of this patent is extended or adjusted under 35 U.S.C. 154(b) by 58 days.

(21) Appl. No.: 13/375,179

(22) PCT Filed: Jun. 24, 2009

(86) PCT No.: PCT/JP2009/061496
§ 371 (c)(1),
(2), (4) Date: Nov. 29, 2011

(87) PCT Pub. No.: WO2010/150366
PCT Pub. Date: Dec. 29, 2010

(65) Prior Publication Data
US 2012/0069586 A1 Mar. 22, 2012

(51) Int. Cl.
*B60Q 1/06* (2006.01)
*F21V 29/00* (2006.01)
*F21V 7/20* (2006.01)
*G03B 21/16* (2006.01)
(Continued)

(52) U.S. Cl.
CPC .............. *G03B 21/16* (2013.01); *F21V 29/004* (2013.01); *G03B 21/2033* (2013.01); *F21V 29/225* (2013.01); *F21V 29/30* (2013.01); *F21Y 2101/02* (2013.01)
USPC .............................. 362/294; 362/373; 362/345

(58) Field of Classification Search
USPC ............ 362/547, 218, 249.02, 264, 294, 373, 362/345
See application file for complete search history.

(56) References Cited

U.S. PATENT DOCUMENTS 3,596,125 A * 7/1971 Seigel ............................. 313/22
6,002,987 A * 12/1999 Kamiya et al. .................. 702/56
(Continued)

FOREIGN PATENT DOCUMENTS

JP 2005-79149 (A) 3/2005
JP 2005-108544 (A) 4/2005
(Continued)

OTHER PUBLICATIONS

International Search Report (ISR) (PCT Form PCT/ISA/210) dated Oct. 6, 2009.
(Continued)

*Primary Examiner* — David J Makiya
*Assistant Examiner* — Bryon T Gyllstrom
(74) *Attorney, Agent, or Firm* — McGinn IP Law Group, PLLC

(57) ABSTRACT

Provided are a light source device that can effectively cool a surface side of a light-emitting element substrate, and a projection type display device that includes the same. The light source device includes substrate (290), light-emitting element (210), optical element (400), and optical element support member (300). Two through-holes (220) are formed in substrate (290). Light-emitting element (210) is mounted on substrate (290). Optical element support member (300) is located to surround two through-holes (220) and light-emitting element (210), and forms, with substrate (290), flow path (700) that passes through light exit surface (211) of light-emitting element (210). Each through-hole (220) and flow path (700) are connected to each other.

19 Claims, 7 Drawing Sheets

(51) Int. Cl.
*G03B 21/20* (2006.01)
*F21Y 101/02* (2006.01)

(56) References Cited

U.S. PATENT DOCUMENTS

| | | | |
|---|---|---|---|
| 6,071,000 A * | 6/2000 | Rapp | 362/547 |
| 6,183,114 B1 * | 2/2001 | Cook et al. | 362/294 |
| 6,224,248 B1 * | 5/2001 | Chiba | 362/580 |
| 6,719,446 B2 * | 4/2004 | Cao | 362/547 |
| 7,262,830 B2 * | 8/2007 | Shigaraki | 355/30 |
| 7,344,296 B2 * | 3/2008 | Matsui et al. | 362/652 |
| 7,360,903 B2 * | 4/2008 | Yamada | |
| 2008/0137337 A1 * | 6/2008 | Cheng et al. | 362/249 |
| 2008/0144319 A1 * | 6/2008 | Chang et al. | 362/294 |
| 2008/0205030 A1 * | 8/2008 | Hargreaves | 362/1 |
| 2009/0059594 A1 * | 3/2009 | Lin | 362/294 |

FOREIGN PATENT DOCUMENTS

| | | |
|---|---|---|
| JP | 2006-47914 (A) | 2/2006 |
| JP | 2007-73984 (A) | 3/2007 |
| JP | 2007-148341 (A) | 6/2007 |
| JP | 2008-90260 (A) | 4/2008 |

OTHER PUBLICATIONS

Japanese Office Action dated Apr. 3, 2012, with partial English translation.

* cited by examiner

LIGHT SOURCE DEVICE AND PROJECTION TYPE DISPLAY DEVICE INCLUDING THE SAME

TECHNICAL FIELD

The present invention relates to a light source device and a projection type display device including the same.

BACKGROUND ART

In recent years, a power LED (Light Emitting Diode) that can supply power of several watts has been made commercially available from each maker. Even a super-large current LED has been developed at present as a light source for a projection type display device which can accept current of 20 or 30 amperes and which exceeds the 100 watts power consumption level of a household.

However, even when such a super-large current LD is used, brightness equal to that of a discharge lamp currently used in many projection type display devices cannot be acquired. To increase brightness of a LED light source, the supply power must be increased more. The increase in supply power has been accompanied by a difficulty of sufficiently cooling heat generated at a LED module including a LED or a substrate on which the LED is mounted.

Cooling of the LED module requires a cooling scale greater than the cooling scale necessary for a CPU (Central Processing Unit) for a personal computer.

Under these circumstances, as means for cooling the LED module, for example, a means is employed, which fixes a large heat sink and an air-cooling fan to the back of a steel substrate of about 30 millimeters square on which a LED as a light-emitting element is mounted, namely, a side opposite a light exit surface of the LED. Alternatively, as discussed in Patent Literature 1 (JP2007-148341A) shown in FIGS. 1 to 3, an efficient cooling method such as a liquid-cooling method for executing cooling by fixing a water-cooling heat-receiving jacket to the back of the substrate is employed.

Concerning heat generated at the LED module, heat resistance from a junction of the LED and the substrate to the back of the LED substrate and a permissible temperature of the junction generally depend on a form of the LED module. For example, specifications or a data sheet describes a heat resistance value (hereinafter, Rj-b) between the junction and the back of the LED substrate, and a permissible temperature of the junction. The temperature of the junction affects a life of the light source. Because the temperature of the junction is higher, the life of the light source is shorter. The projection type display device using the LED light source is advantageous in that the life of the light source is longer, the color reproduction range is wider than that of the discharge lamp, or the light can be instantaneously switched on/off. It is therefore desired that to achieve the projection type display device of a long light source life, the temperature of the junction be prevented from exceeding a permissible range or that the device be used in a state in which the temperature is as low as possible.

Concerning a temperature increase of the junction, in the case of cooling only from the back of the substrate surface on which the LED is mounted (refer to Patent Literature 2 (JP2008-90260A) shown in FIG. 12), an increase in the value of the temperature from the junction to the back of the LED substrate can be calculated based on heat resistance Rj-b and supply power. A temperature limit of the junction has been determined. Hence, when an ambient temperature is determined, a limit in the supply of power to the LED module can be calculated. The supply power W can be calculated by multiplication of a voltage Vf applied to the light-emitting element with current If flowing through the light-emitting element, namely, W=VF×If. For example, in the case of Rj-b of 0.7° C./W, when power of 150 watts is supplied, 0.7° C./W×150W=105° C. is set. This means that the temperature increase from the junction to the back of the LED substrate is 105° C. When the ambient temperature is 35° C., the temperature of the junction becomes 140° C. by adding the ambient temperature to the temperature increase of 105° C. Normally, a maximum permissible temperature of the junction of the LED is about 120 to 130° C. Thus, when large power exceeding 150 watts is supplied, the temperature of the junction exceeds its maximum permissible temperature.

In order to solve the problems concerning the temperature of the junction, the device must be not only cooled from the back of the LED substrate but also efficiently cooled from the surface side of the LED substrate.

However, in the projection type display device of a household or office size, there is a difficulty of securing a cooling space for cooling from the surface side of the LED substrate of the light source, namely, the light exit surface side of the LED. In other words, on the surface side of the LED substrate, a condenser lens is disposed close to the light-emitting element to effectively use light emitted from the LED. In addition, a thick electric wire or a connector is disposed on the substrate surface side to supply large current of several tens of amperes to the LED module. A temperature sensor located on the substrate surface side to monitor a temperature needs a wire, and a connector for temperature sensor connection must be mounted on the substrate. It has been difficult to secure a new space for cooling means in addition to the space for accommodating a large number of such components.

In the projection type display device of the household or office size, when the liquid-cooling method including the water-cooling method is employed as cooling means of the LED module, it is not easy to secure space for installing a cooling device in the LED module. Even when space can be secured, complete sealing to prevent leakage of cooling liquid or protecting of electric insulation from liquid leakage is not easy. When the liquid-cooling method is employed, maintenance troubles occur such as a need to replenish a reservoir tank with additional refrigerant after evaporation of a refrigerant through a tube.

CITATION LIST

Patent Literature

Patent Literature 1: JP2007-148341A
Patent Literature 2: JP2008-90260A

SUMMARY OF INVENTION

The present invention provides devices that can solve the problems described above in the background art. An object is to provide, for example, a light source device that can effectively cool a surface side of a substrate on which a light-emitting element is mounted, and a projection type display device that includes the light source device. Another object is to provide a light source device in which there is no need to secure any new space for light-emitting element cooling means on a surface side of a substrate, and a projection type display device that includes the light source device.

According to an aspect of the present invention, a light source device includes a substrate, a light-emitting element mounted on the substrate, and a first member. A first through-hole and a second through-hole are formed in the substrate. The first member is located to surround the first through-hole, the second through-hole, and the light-emitting element, and forms, with the substrate, a flow path passed through a light exit surface of the light-emitting element. The first through-hole and the second through-hole are connected to the flow path.

According to another aspect of the present invention, a projection type display device includes the abovementioned light source device.

Effect of Invention

In the light source device and the projection type display device according to the aspects of the present invention, between the substrate and an optical element support member located to surround the light-emitting element, the flow path is formed through which fluids pass through the light exit surface of the light-emitting element to cool the light exit surface flow. The flow path, namely, an internal space between the optical element member and the substrate, accordingly functions as light-emitting element cooling means. Thus, there is no need to provide any means for cooling heat generated from the light-emitting element in the substrate surface in addition to the optical element support member to surround the light-emitting element. It is therefore not necessary to secure any new space for cooling means on the light exit surface side of the light-emitting element, namely, the surface side of the substrate. Moreover, heat accompanying light emission from the light exit surface of the light-emitting element can be cooled by a convection flow of the fluids that have passed through the light exit surface.

As a result, the present invention can provide a light source device that can effectively cool the surface side of the substrate having the light-emitting element mounted thereon and does not need to secure any new space for light-emitting element cooling means, and the projection type display device that includes the light source.

DESCRIPTION OF EMBODIMENTS

Hereinafter, a light source device and a projection type display device including the same according to the present invention are described with reference to the accompanying drawings.

First Embodiment

Figure 1:
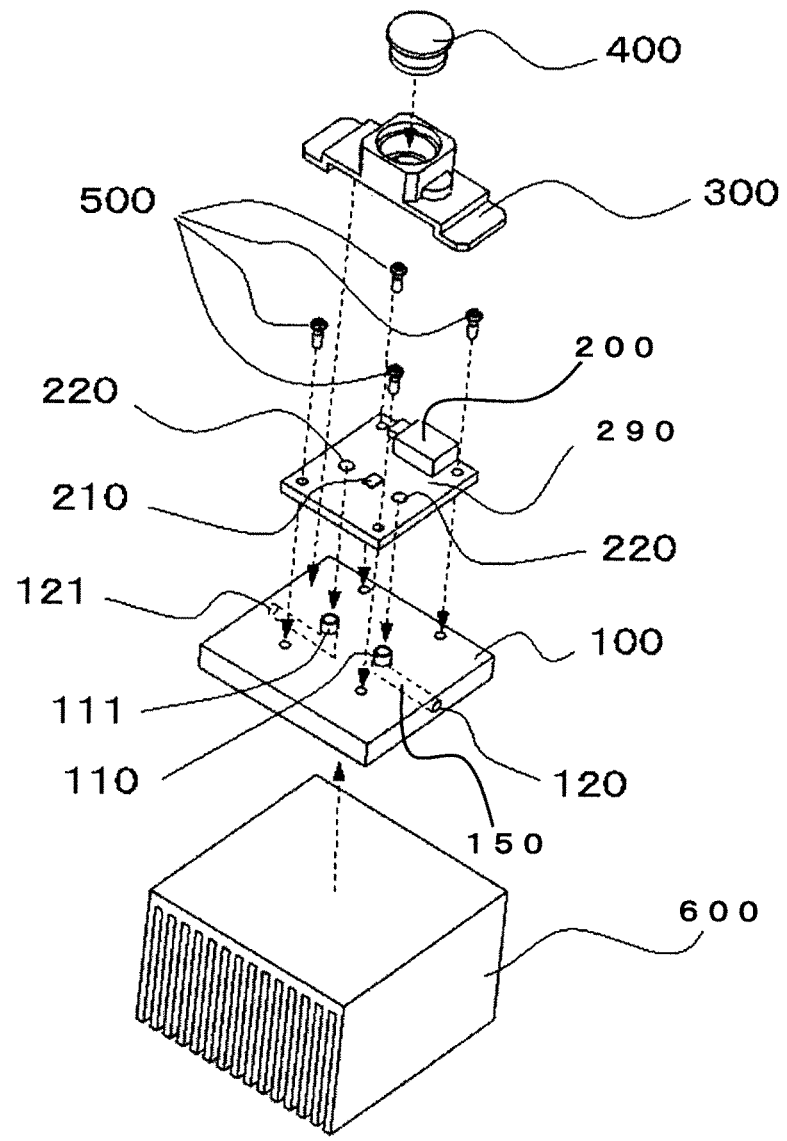
FIG. 1 is an exploded view showing a configuration of a light source device according to a first embodiment of the present invention.
Figure 2:
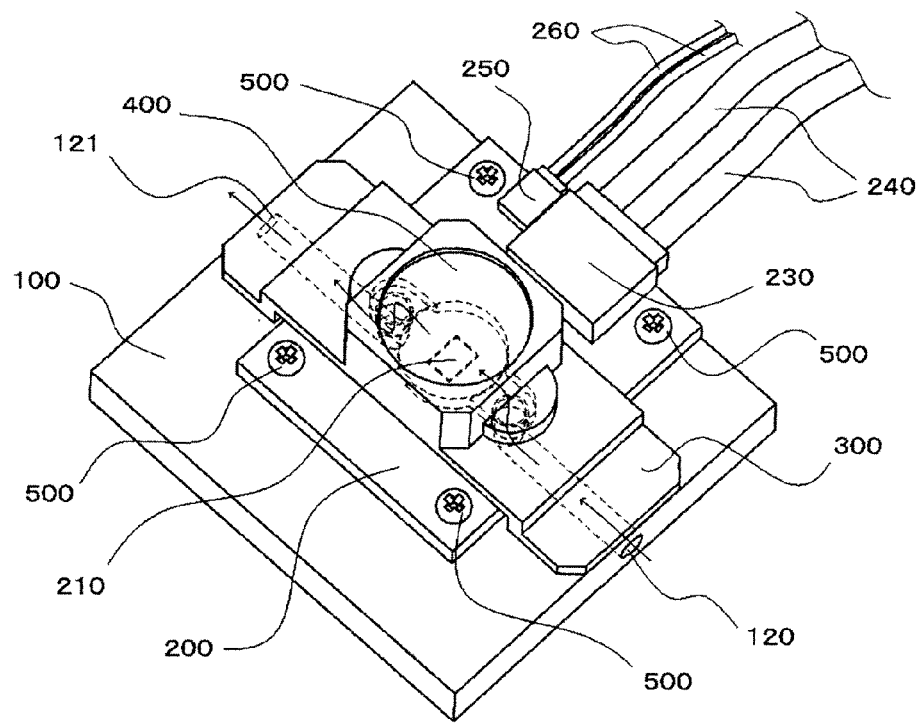
FIG. 2 is a perspective view showing the light source device according to the first embodiment of the present invention.
Figure 3:
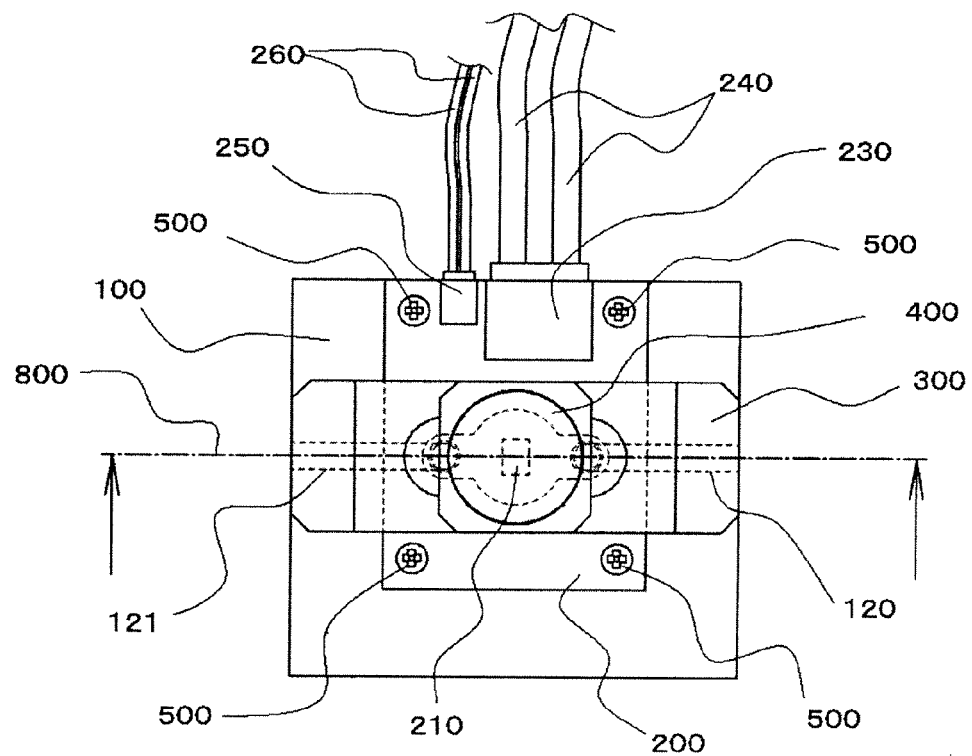
FIG. 3 is a top view showing the light source device seen from a light-emitting surface side according to the first embodiment of the present invention.
Figure 4:
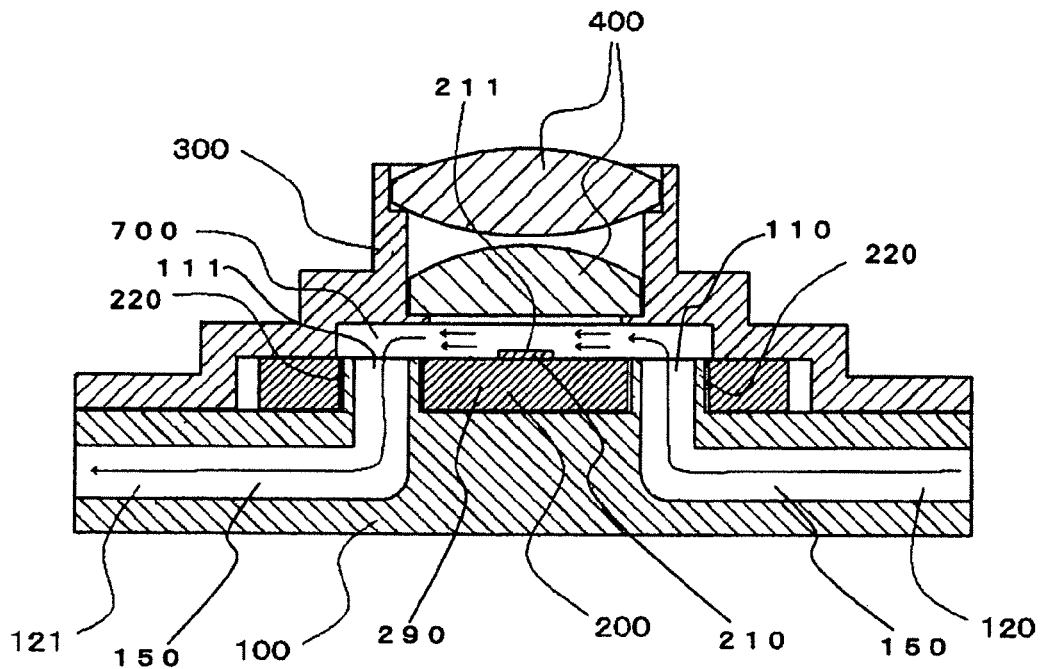
FIG. 4 is a sectional view taken along the cut line of the light source device shown in FIG. 3.
Figure 5:
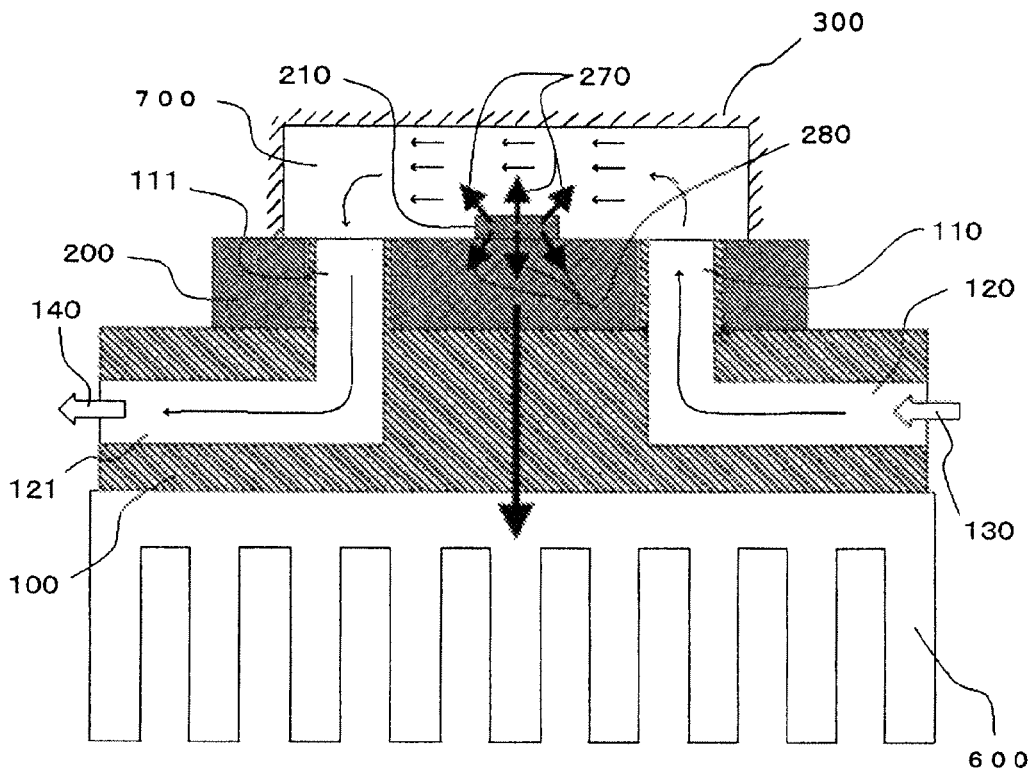
FIG. 5 is a block diagram schematically showing an operation of the light source device shown in FIG. 4.

FIG. 1 is an exploded view showing a configuration of a light source device according to a first embodiment of the present invention. FIG. 2 is a perspective view showing the light source device according to the first embodiment of the present invention. FIG. 3 is a top view showing the light source device seen from a light exit side according to the first embodiment of the present invention. FIG. 4 is a sectional view taken along the cut line of the light source device shown in FIG. 3. FIG. 5 schematically shows an operation of the light source device shown in FIG. 4. In FIGS. 2 and 3, a heat radiator is not shown.

As shown in FIG. 1, the light source device according to the first embodiment of the present invention includes light-emitting element module support member 100, light-emitting element module 200, optical element support member 300, optical element 400, fixing screw 500, and heat radiator 600.

As shown in FIG. 4, light-emitting element module support member 100 can support light-emitting element module 200, and is located on a side opposite light exit surface 211 side of light-emitting element 210. Light-emitting element module support member 100 includes cylindrical pipe line 150 through which fluids, particularly gas, flow. Pipe line 150 includes first and second holes 110 and 111 that are connected to flow path 700 formed by optical element support member 300 and light-emitting element module support member 100. A fluid inlet or a fluid outlet of pipe line 150 includes first hole 110, second hole 111, third hole 120, and fourth hole 121. First hole 110 is connected to third hole 120, and second hole 111 is connected to fourth hole 121.

In the configuration of pipe line 150 and flow path 700, the fluids are supplied by fluid supply means (not shown) located outside light-emitting element module support member 100.

The fluids flow, as shown in FIG. 4, into third hole 120 of pipe line 150. The fluids that have flowed into third hole 120 pass through pile line 150 to flow from first hole 110 into flow path 700. The fluids pass through light exit surface 211 of light-emitting element 210 located in flow path 700 to be heated, and then flow from second hole 111 into pipe line 150. The fluids are then discharged out of light-emitting element module support member 100 through fourth hole 121 that is an outlet.

The flow of the fluids shown in FIG. 4 takes a form where the fluids flow from third hole 120 located at a right end of pipe line 150 as described above, and are finally discharged out of fourth hole 121 located at a left edge of pipe line 150. However, the flow is not limited to this form. In other words, pipe line 150 and flow path 700 only need to be configured such that the fluids passed through pipe line 150 flow from at least one of two holes 110 and 111 into flow path 700. More specifically, an opposite form can be employed where the fluids flow from fourth hole 121 located at the left end of pipe line 150, and are finally discharged out of third hole 120 located at the right end of pipe line 150.

Pipe line 150 includes two edges to form first hole 110 and second hole 111. The two edges project from pipe line 150 side of light-emitting element module support member 100 to flow path 700 side that includes substrate 290 and optical element support member 300 (refer to FIG. 4). Each projected edge (projection portion) is inserted into a plurality of through-holes 220 formed in substrate 290 of light-emitting element module 200. The insertion of each edge into the plurality of through-holes 200 enables assembling of light-emitting element module 200 to be highly accurately aligned with light-emitting element module support member 100. In other words, each edge functions as positioning means of light-emitting element module 200 with respect to light-emitting element module support member 100.

Each edge can be located in an arbitrary position of light-emitting element module support member 100. In FIG. 1, the two edges are shown. However, the number of edges can be three or more. Each edge can be formed integrally with light-emitting element module support member 100, or can include another cylindrical component to be inserted by pressure into light-emitting element module support member 100.

Concerning material and a forming method of light-emitting element module support member 100, it is preferable that light-emitting element module support member 100 be integrally formed by using a highly heat conductive material such as copper or aluminum. Alternatively, to simplify component manufacturing, light-emitting element module support member 100 can be formed as a plurality of components with a position of third hole 120 or fourth hole 121 set as a component boundary.

Light-emitting element module 200 is fixed to a surface of light-emitting element module support member 100 that includes the plurality of holes 110, 111, 120, and 121 (refer to FIG. 1). Light-emitting element module 200 includes substrate 290 and light-emitting element 210. Light-emitting element 210 is mounted on substrate 290, and includes light exit surface 211 through which light exits to optical element 400 side. Substrate 290 includes a plurality of through-holes 220 extending in its thickness direction.

Each through-hole 220 can be set in an arbitrary position on substrate 290 corresponding to a position of each edge to form first hole 110 or second hole 111. In FIG. 1, the two edges are shown. However, the number of edges can be three or more. Accuracy is particularly necessary for a position of light-emitting element 210, and hence it is preferable that each through-hole 220 be formed as close as possible to light-emitting element 210.

According to the embodiment, each edge serving as positioning means is formed cylindrical, and an outlet of its corresponding through-hole is formed circular. However, this combination is in no way limitative. In other words, a combination can be employed where each edge is formed to be a hollow cube, and the outlet of each through-hole is formed polygonal.

As shown in FIG. 2, light-emitting element module 200 further includes power connector 230, power cable 240, temperature sensor connector 250, and temperature sensor cable 260. Power cable 240 is inserted into power connector 230, and temperature sensor cable 260 is inserted into temperature sensor connector 250. Power connector 230 and power cable 240 shown in FIG. 2 each has two terminals. However, an arbitrary number of terminals can be used depending on the configuration of a light-emitting chip of light-emitting element 210.

Supplying power to light-emitting element module 200 from a power source (not shown) via power cable 240 enables light-emitting element 210 to emit light. Temperature sensor cable 260 is connected to a temperature measuring component (not shown) mounted on light-emitting element module 200, and wired through temperature sensor connector 250. A thermistor or the like is used for the temperature measuring component. The temperature measuring component enables monitoring of a temperature of light-emitting element 210.

As shown in FIG. 4 that is a sectional view taken along cut line 800 shown in FIG. 3, optical element support member 300 is mounted on light-emitting element module support member 100. Cut line 800 is located on an extension line of a straight line connecting first hole 110, second hole 111, third hole 120, fourth hole 121, and light-emitting element 210. Optical element support member 300 is located on light exit surface 211 side to surround substrate 290 and light-emitting element 210, and supports optical element 400. Optical element support member 300 includes a hole formed to connect flow path 700 with first hole 110 and second hole 111.

Optical element support member 300 forms flow path 700 with substrate 290. Flow path 700 extends along cut line 800. As shown in FIG. 4, flow path 700 is concaved in optical element support member 300. Fluids, particularly gas, that have passed through light exit surface 211 to cool light exit surface 211 flow through flow path 700.

As shown in FIG. 4, optical element 400 includes a plurality of lenses, and refracts light that has exited from light exit surface 211. Optical element 400 is located in a concave portion formed in an upper part of optical element support member 300 located on light exit surface 211 side of light-emitting element 210 (refer to FIG. 4). To capture light emitted from light-emitting element 210 as much as possible, it is preferable that a portion of optical element 400 near light-emitting element 210 be located as close as possible to light-emitting element 210.

As shown in FIG. 1, fixing screw 500 is means for fixing light-emitting element module 200 to light-emitting element module support member 100. In FIGS. 1 to 3, both members 100 and 200 are fixed by four screws. However, the number of screws can be selected as occasion demands.

As shown in FIG. 1, heat radiator 600 is fixed to a surface opposite a surface on which light-emitting element module 200 is mounted on light-emitting element module support member 100. It is preferable that heat radiator 600 be made of a highly heat conductive metal component such as copper or aluminum, and cooling performance be improved by blowing wind by an axial fan. Though not shown in FIG. 1, to reduce heat resistance, it is preferable that TIM (Thermal Interface Module) such as a heat conductive paste or a heat conductive sheet be inserted into a contact place between light-emitting element module 200 and light-emitting element module support member 100. Alternatively, this TIM can be inserted into a contact place between light-emitting element module support member 100 and heat radiator 600.

The light source device thus configured provides the following effects. Referring to FIG. 4, light emitted from light-emitting element 210 is passed through optical element 400 to illuminate a projection type optical component at a rear stage. Light-emitting element 210 generates heat along with light emission. However, the LED is used for light-emitting element 210, and heat is generated from about 90% of the power supply, through this was not the original intention. Referring to FIG. 5, light-emitting element 210 radially emits heat in arrow directions 270 and 280. The heat radiated in arrow direction 280 is transmitted to light-emitting element module support member 100 through heat conduction that is a heat conduction form between solids, and then transmitted to heat radiator 600. Heat radiator 600 includes many fins, and is made of the highly heat conductive metal material, and hence the heat that is transmitted to heat radiator 600 is quickly transmitted to the fins. As a result, the heat is exchanged by a convection flow of fluids around the fins to achieve efficient cooling.

Cooling liquids that have entered third hole 120 of pipe line 150 in arrow direction 130 shown in FIG. 5 flow through first hole 110 into flow path 700. Then, the fluids are passed through light emitting element 210, and discharged from second hole 111 through fourth hole 121. FIG. 5 does not show a structure of generating and supplying fluids to third hole 120. A flow path can be formed to guide the fluids to third hole 120, and the fluids can be blown in arrow direction 130 by a blower fan or an air pump. Conversely, wind can be blown from fourth hole 121 in arrow direction 140 by the blower fan.

With this configuration, the heat is effectively exchanged between the fluids and the radiated heat by the convection flow of the cooling fluids supplied from first hole 110 of pipe line 150 and passed through light exit surface 211 of optical element 210. As a result, the heat generated along with the light emitted from light-emitting element 210 in arrow direction 270 is efficiently cooled.

Thus, the heat radiated from light-emitting element 210 in arrow direction 270 and arrow direction 280 is cooled by the two methods, namely, the method of cooling from heat radiator 600 through light-emitting element module support member 100, and the method of cooling by the fluids supplied from first hole 110. Thus, cooling is efficiently executed for a greater amount of generated heat. Higher cooling performance enables supplying of much more power to light-emitting element 210. Hence, light-emitting element 210 can emit brighter light.

According to the embodiment, between substrate 290 and optical element support member 300 located to surround light-emitting element 210, flow path 700 is formed through which the fluids that have passed through light exit surface 211 of light-emitting element 210 to cool light exit surface 211 flow. Thus, flow path 700, namely, the internal space between the optical element member and substrate 290, functions as cooling means of light-emitting element 210. Hence, there is no need to provide, on the surface of substrate 290, any other means for cooling heat generated from light-emitting element 210 outside optical element support member 300 that surrounds light-emitting element 210. It is therefore unnecessary to secure any new space for cooling means on light exit surface 211 side of light-emitting element 210, namely, the surface side of substrate 290.

Thus, the present invention can provide the light source device that can effectively cool the surface side of the substrate having the light-emitting element mounted thereon, and doses not need to secure any new space for cooling, and a projection type display device that includes the light source device.

Second Embodiment

Figure 6:
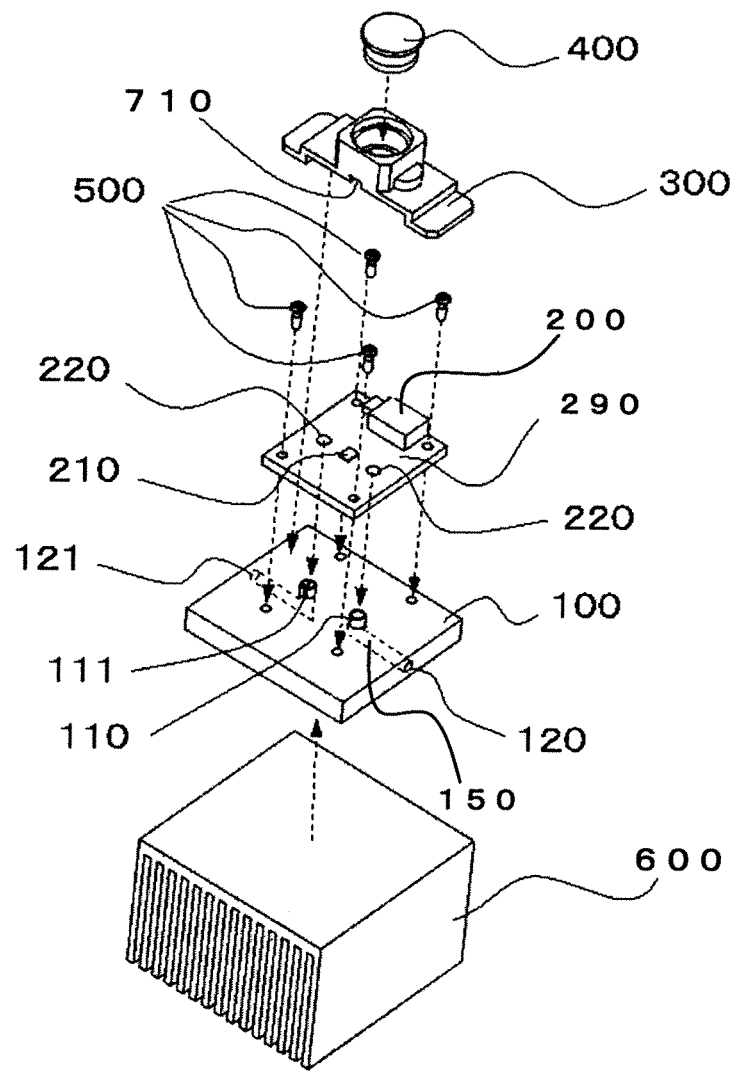
FIG. 6 is an exploded view showing a configuration of a light source device according to a second embodiment of the present invention.
Figure 7:
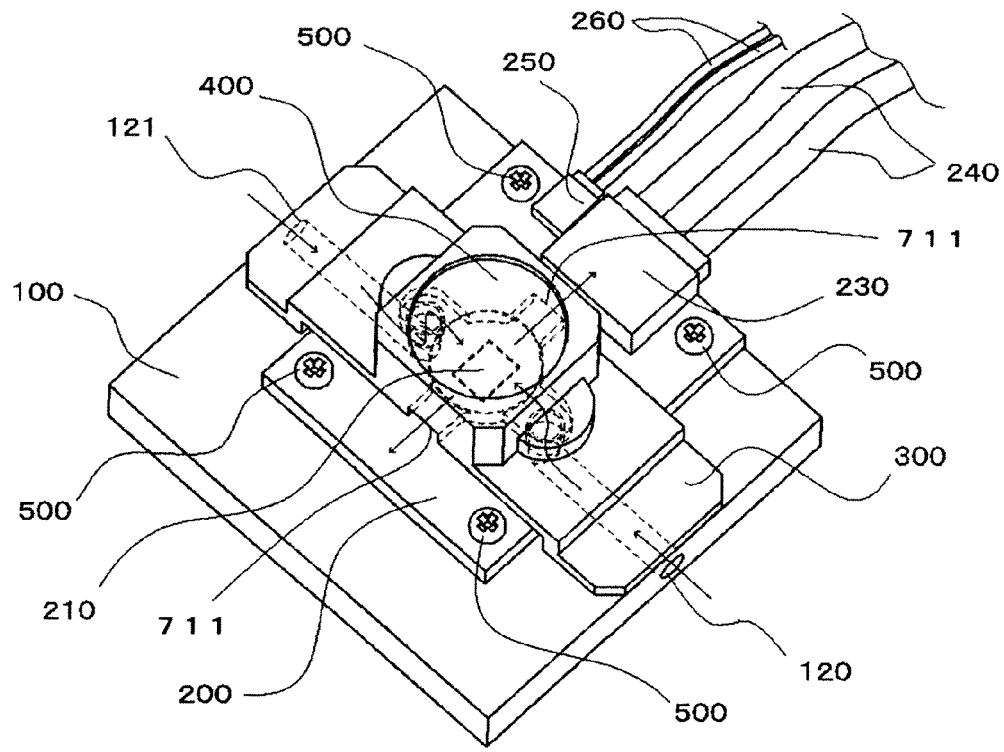
FIG. 7 is a perspective view showing the light source device according to the second embodiment of the present invention.
Figure 8:
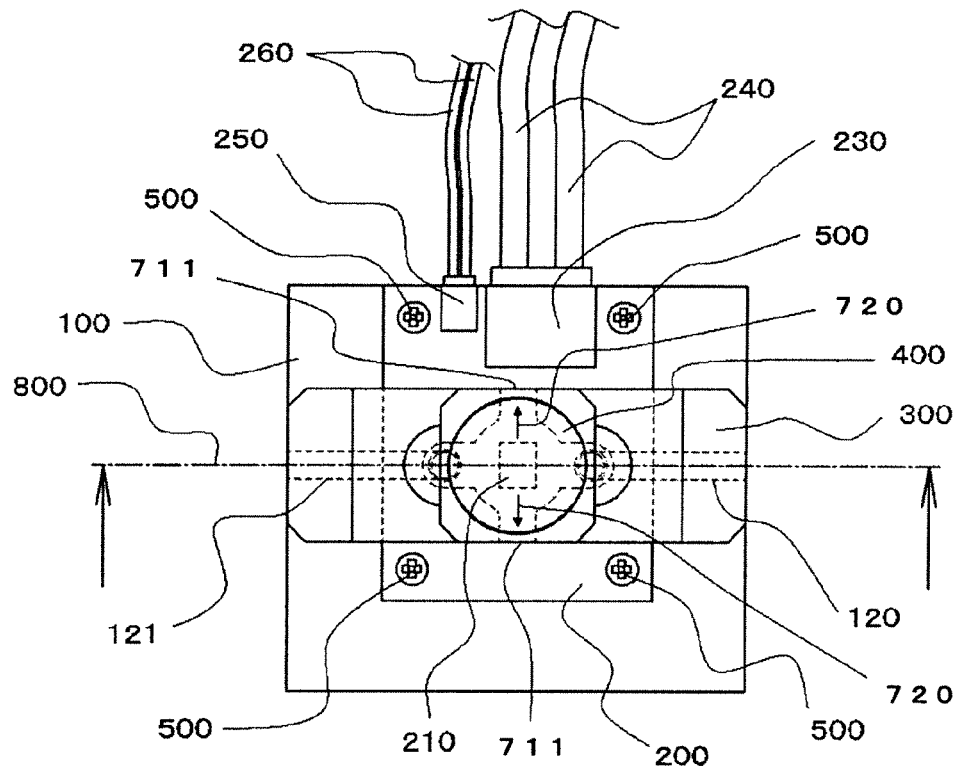
FIG. 8 is a top view showing the light source device seen from a light-emitting surface side according to the second embodiment of the present invention.
Figure 9:
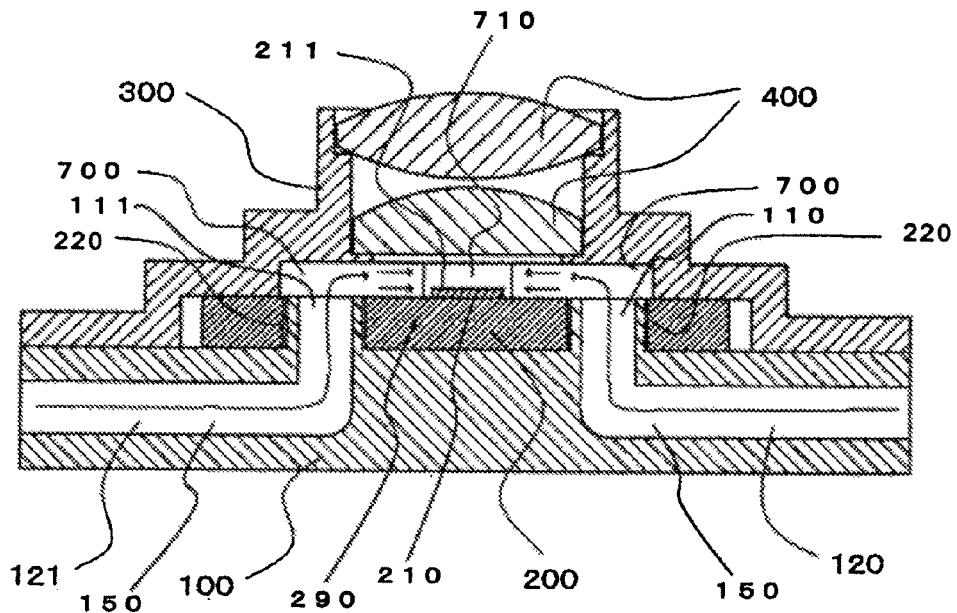
FIG. 9 is a sectional view taken along the cut line of the light source device shown in FIG. 8.
Figure 10:
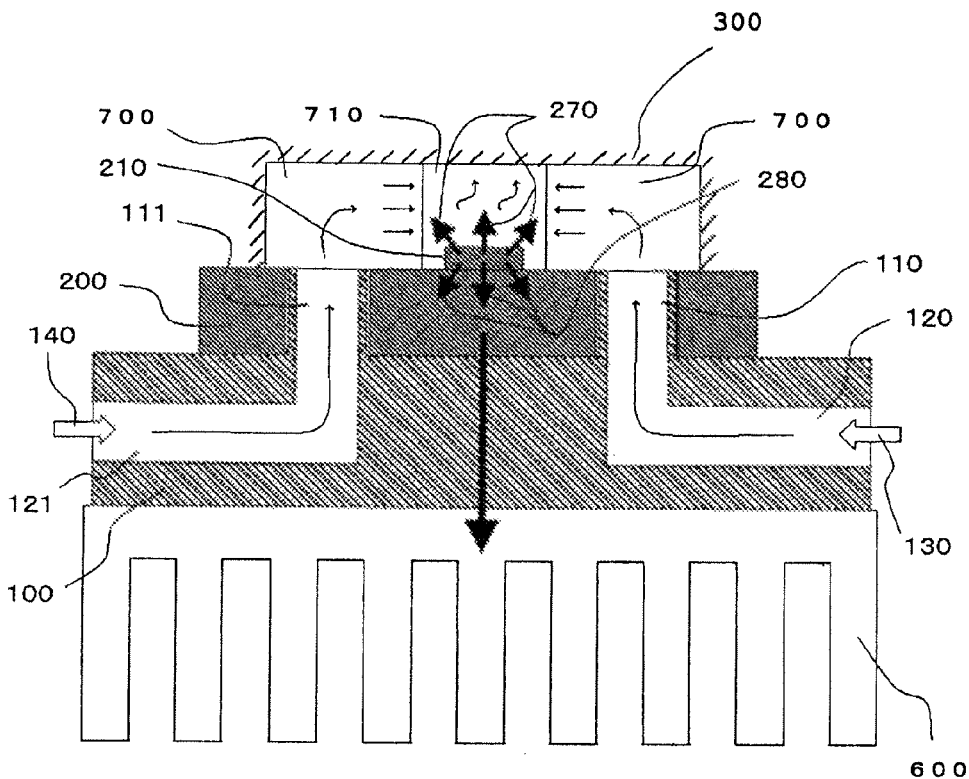
FIG. 10 is a block diagram schematically showing an operation of the light source device shown in FIG. 9.

FIG. 6 is an exploded view showing a configuration of a light source device according to a second embodiment of the present invention. FIG. 7 is a perspective view showing the light source device according to the second embodiment of the present invention. A heat radiator is not shown. FIG. 8 is atop view showing the light source device seen from a light exit side according to the second embodiment of the present invention. FIG. 9 is a sectional view taken along the cut line of the light source device shown in FIG. 8. The cut line is a straight line connecting an inlet, an outlet, a suction port, an exit port, and a light-emitting element as in the case of the light source of the first embodiment shown in FIG. 3. FIG. 10 schematically shows an operation of the light source device shown in FIG. 9.

A difference of the embodiment from the first embodiment is, for example, as shown in FIG. 7, in which optical element support member 300 includes a plurality of flow paths 700 and 710, and flow path 710 includes two outlets 711. More specifically, optical element support member 300 of the light source device according to the embodiment forms, with substrate 290, another flow path 710 extending in a direction vertical to an extending direction of flow path 700. Another flow path 710 includes two outlets 711 extending in a direction vertical to the extending direction of flow path 700. Fluids flow from two holes 110 and 111 of pipe line 150 into flow path 700. The fluids heated through light exit surface 211 located in flow path 700 are passed through another flow path 710 to be discharged out of two outlets 711.

The configuration in which fluids are supplied from two holes 110 and 111 can increase the flow rate more than the configuration in which fluids are supplied from one of the holes, and hence cooling performance can be improved. Flow path 710 different from flow path 700 is formed by optical element support member 300 and substrate 290, and hence the flow path volume increases in optical element support member 300. Another flow path 710 includes two outlets 711. Thus, the fluids heated through heat exchange with heat radiated from light exit surface 211 of light-emitting element 210 are passed through another flow path 711 increasing the flow path volume to be effectively discharged out of the light source device through two outlets 711.

The light source device of the embodiment thus configured provides the following effects. Referring to FIG. 10, light-emitting element 210 radially emits heat in arrow directions 270 and 280. The heat radiated in arrow direction 280 is transmitted to light-emitting element module support member 100 through heat conduction that is a heat transfer system between solids, and then is transmitted to heat radiator 600. Heat radiator 600 includes many fins, and hence the heat transmitted to the fins is exchanged by a convection flow of fluids around the fins to achieve efficient cooling.

Liquids that have entered third hole 120 of pipe line 150, as indicated by arrow 130 shown in FIG. 10, flow through first hole 110 into flow path 700. Then, the fluids are passed through light exit surface of light emitting element 210, and discharged from the two outlets of flow path 710. Liquids that have entered fourth hole 121 of pipe line 150, as indicated by arrow 140 shown in FIG. 10, flow through second hole 111 into flow path 700. Then, the fluids are passed through light emitting element 210, and discharged from two outlets 711 of flow path 710. FIG. 10 does not show a structure for generating and supplying fluids to third hole 120 and fourth hole 121 as in the case of the light source device of the first embodiment shown in FIG. 5. As in the case of the first embodiment, a flow path can be formed to guide the fluids to third hole 120, and the fluids can be blown in arrow direction 130 by a blower fan or an air pump. Conversely, wind can be blown from fourth hole 121 in arrow direction 140 by the blower fan.

With this configuration, the heat radiated from light-emitting element 210 in arrow direction 270 shown in FIG. 10 is effectively exchanged by the convection flow of the cooling fluids supplied from first hole 110 and second hole 111 of pipe line 150 and passed through light exit surface 211 of optical element 210 located in flow path 700. As a result, the heat generated along with the light emitted from light-emitting element 210 in arrow direction 270 is efficiently cooled.

Thus, the heat radiated from light-emitting element 210 in arrow direction 270 and arrow direction 280 is cooled by the two methods, namely, the method of cooling from heat radiator 600 through light-emitting element module support member 100, and the method of cooling by the fluids supplied from first hole 110 and second hole 111. Thus, cooling is effectively executed for a greater amount of generated heat. Higher cooling performance enables supplying of much more power to light-emitting element 210. Hence, light-emitting element 210 can emit brighter light.

When a flow of the fluids in arrow direction 720 shown in FIG. 8 is not vertical to cut line 800 (straight line connecting outlet, inlet, suction port, fourth hole, and light-emitting element), the fluids may exit from an outlet of flow path 710 without passing through light-emitting element 210. Thus, light-emitting element 210 may not be uniformly cooled. To prevent such a case, it is preferable that an extending direction of flow path 710 of the embodiment be set in a position vertical to cut line 800, namely, an extending direction of flow path 700 so that the fluids flowing from flow path 700 to flow path 710 can be set in arrow direction 720 shown in FIG. 8. It is also preferable that a straight line connecting both outlets 711 of flow path 710 be vertical to cut line 800, namely, the extending direction of flow path 700.

In the light source device thus configured according to the embodiment, between substrate 290 and optical element support member 300 located to surround light-emitting element 210, flow path 700 is formed through which the fluids that have passed through light exit surface 211 of light-emitting element 210 to cool light exit surface 211 flow. Flow path 710 that is different from flow path 700 is formed by optical element support member 300 and substrate 290, and hence the flow path volume increases in optical element support member 300. Thus, flow path 700, namely, the internal space between the optical element member and substrate 290, functions as cooling means of light-emitting element 210. Hence, there is no need to provide, on the surface of substrate 290, any other means for cooling heat generated from light-emitting element 210 outside optical element support member 300 that surrounds light-emitting element 210. It is therefore unnecessary to secure any new space for cooling means on light exit surface 211 side of light-emitting element 210, namely, the surface side of substrate 290. Another flow path 710 includes two outlets 711, and hence the fluids heated through heat exchange with heat radiated from light exit surface 211 of light-emitting element 210 are passed through another flow path 710 increasing the flow path volume to be effectively discharged out of the light source device through two outlets 711.

Thus, the present invention can provide the light source device that can effectively cool the surface side of the substrate having the light-emitting element mounted thereon, and does not need to secure any new space for cooling, and a projection type display device that includes the light source device.

Figure 11:
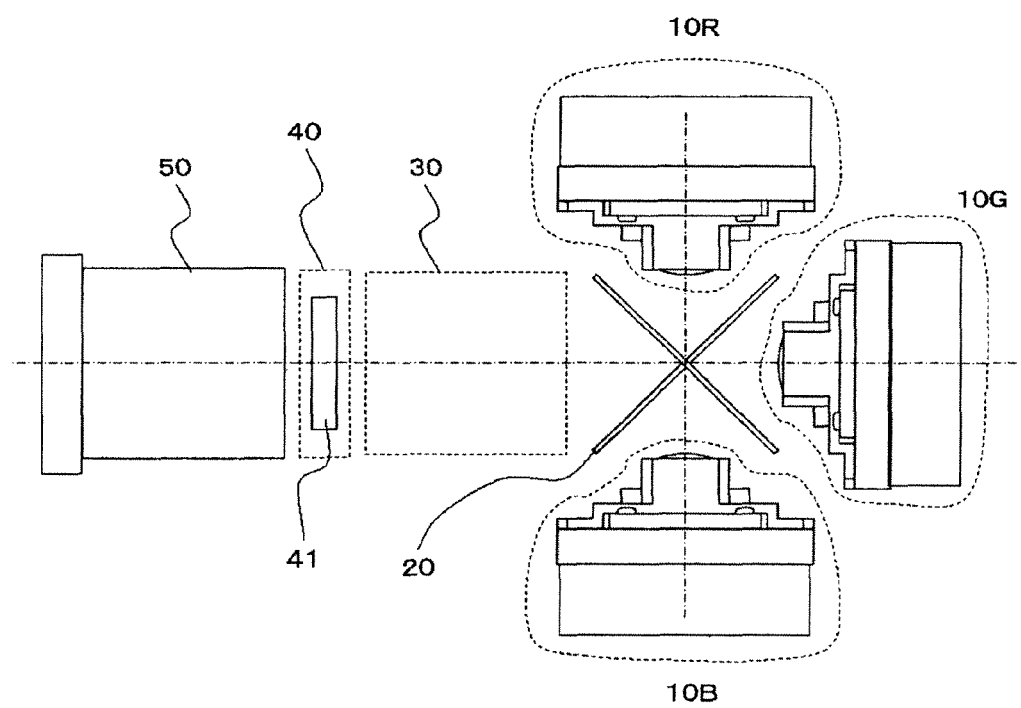
FIG. 11 schematically shows a configuration of a projection type display device to which the light source device of each embodiment of the present invention is applied.

FIG. 11 schematically shows a configuration of a projection type display device to which the light source device according to each embodiment of the present invention is applied. The projection type display device shown in FIG. 11 includes light source device 10R, light source device 10G, light source device 10B, color synthesis optical system 20, illumination optical system 30, panel unit 40, optical modulation element 41, and projection optical system 50.

To acquire white light, the projection type display device includes light source device 10R that emits red light, light source device 10G that emits green light, and light source device 10B that emits blue light. It is preferable that light-emitting diodes be used for light source device 10R, light source device 10G and light source device 10B. It is preferable that a cross dichroic mirror or a cross dichroic prism be used for color synthesis optical system 20. Light source device 10G is located to linearly transmit light through color synthesis optical system 20, and light source device 10R and light source device 10B are located so that their optical paths can be roughly perpendicular to light source device 10G. Illumination optical system 30 functions to uniformly apply illumination lights from light source devices 10R, 10G, and 10B to optical modulation element 41. Optical modulation element 41 is located in panel unit 40. Optical modulation element 41 is a transmissive liquid crystal display panel that uses a FSC (Field Sequential Color) display method. FIG. 11 shows an example of using the transmissive liquid crystal display panel for optical modulation element 41. However, the optical modulation element is not limited to this form. In other words, a reflective liquid crystal display panel such as a DMD (Digital Micromirror Device) or a LCoS (Liquid Crystal on Silicon) (registered trademark) panel can be used by changing a layout of the illumination optical system or the projection optical system. Projection optical system 50 functions to project the illumination light modulated by optical modulation element 41 to a screen (not shown).

According to the projection type display device thus configured, the red light source, the green light source, and the blue light source are sequentially lit, and the optical modulation element respectively modulates lights thereof according to a R video signal, a G video signal, and a B video signal. Then, R, G, and B images are sequentially displayed, and synthesized to be recognized as a color image by human eyes. Optical paths of the color lights emitted from light sources 10R, 10Q and 10B are integrated into one by color synthesis means 20.

Illumination optical system 30 then illuminates optical modulation element 41 in panel unit 40. The illumination light that has entered optical modulation element 41 is optically modulated by optical modulation element 41, and an image is projected to the screen (not shown) by projection lens 50.

In this case, heat generated from light-emitting element 210 is efficiently discharged at light sources 10R, 10G, and 10B as described above. Hence, much more power can be supplied to the light source devices. A bright projection type display device can accordingly be achieved. A junction temperature of the light-emitting element can be reduced, and hence lives of the light source devices can be prolonged. As a result, a projection type display device of a long life can be achieved.

EXPLANATION OF REFERENCE NUMERALS 100 light-emitting element module support member (second member)
110 first hole
111 second hole
120 third hole
121 fourth hole
150 pipe line
210 light-emitting element
290 substrate
300 optical element support member (first member)
400 optical element
700 flow path
710 another flow path
711 outlet

The invention claimed is:

1. A light source device, comprising:
   a substrate on which a first through-hole and a second through-hole are formed;
   a semiconductor light-emitting element mounted on the substrate;
   a flow passage for a fluid in which the semiconductor light-emitting element is arranged, the flow passage being formed so as to pass through a light exit surface of the semiconductor light-emitting element via a mounting surface of said substrate on which the semiconductor light-emitting element is mounted;
   a first member configured to form said flow passage with the substrate;
   a second member located on a side opposite a side of the substrate on which the semiconductor light-emitting element is mounted, and including a first pipe line that is connected to the first through-hole and a second pipe line that is connected to the second through-hole; and
   a heat radiation portion located on said second member,
   wherein the first through-hole and the second through-hole communicate with the flow passage,
   wherein the fluid flows from at least one of the first through-hole and the second through-hole into the flow passage, and
   wherein the first pipe line and the second pipe line each includes a projection portion projected from a side of the second member to a side of the first member, the projection portion of the first pipe line being inserted into the first through-hole, and the projection portion of the second pipe line being inserted into the second through-hole.

2. The light source device according to claim 1, wherein the first through-hole and the second through-hole are located on opposite sides sandwiching the semiconductor light-emitting element.

3. The light source device according to claim 2, wherein the first member includes an outlet in a direction vertical to an extending direction of the flow passage and in a direction along said mounting surface of said substrate.

4. The light source device according to claim 3, further comprising another outlet on a side opposite the outlet sandwiching the semiconductor light-emitting element.

5. The light source device according to claim 3, wherein the fluid flows from the first through-hole and the second through-hole into the flow passage and is exhausted through the outlet.

6. A projection type display device, comprising:
   the light source device specified in claim 1;
   an optical modulation element which optically modulates lights of the light source device; and
   a projection lens which projects lights modulated by the optical modulation element.

7. The light source device according to claim 1, wherein the fluid flows into the flow passage through the first through-hole and passes through the semiconductor light-emitting element and is exhausted through the second through-hole.

8. The light source device according to claim 1, wherein the fluid flows on the light exit surface of the semiconductor light-emitting element in the flow passage.

9. The light source device according to claim 1, wherein the semiconductor light-emitting element is disposed on a surface of the substrate.

10. The light source device according to claim 1, wherein a lower surface of the semiconductor light-emitting element, which opposes the light exit surface of the semiconductor light-emitting element, is disposed on an upper surface of the substrate.

11. The light source device according to claim 1, wherein the first member comprises a concave portion that holds a plurality of lenses that refract exit light from the light exit surface of the semiconductor light-emitting element.

12. The light source device according to claim 11, wherein the substrate and the concave portion of the first member are located on opposing sides of the flow passage.

13. The light source device according to claim 1, wherein the fluid comprises a cooling liquid.

14. The light source device according to claim 1, wherein, in a cross-sectional view of the light source device, a portion of the substrate is disposed within an area between the projection portion of the first pipe line and the projection portion of the second pipe line, and another portion of the substrate is disposed outside the area between the projection portion of the first pipe line and the projection portion of the second pipe line.

15. The light source device according to claim 14, wherein the first member is disposed on an upper surface of said another portion of the substrate.

16. The light source device according to claim 14, wherein a bottom surface of the first member is disposed on an upper surface of said another portion of the substrate.

17. The light source device according to claim 16, wherein the bottom surface of the first member is further disposed on an upper surface of the second member.

18. The light source device according to claim 17, wherein the bottom surface of the first member is further disposed on an upper surface of the flow passage.

19. The light source device according to claim 18, wherein a side surface of the first member is disposed on a side surface of the flow passage.

* * * * *